United States Patent
Zimmerman (10) Patent No.: US 6,920,289 B2
(45) Date of Patent: Jul. 19, 2005

(54) SYSTEM AND METHOD FOR REMOTE OPTICAL DIGITAL NETWORKING OF COMPUTING DEVICES

(75) Inventor: Thomas G. Zimmerman, Cupertino, CA (US)

(73) Assignee: International Business Machines Corporation, Armonk, NY (US)

( * ) Notice: Subject to any disclaimer, the term of this patent is extended or adjusted under 35 U.S.C. 154(b) by 686 days.

(21) Appl. No.: 09/775,374

(22) Filed: Feb. 1, 2001

(65) Prior Publication Data

US 2002/0101638 A1 Aug. 1, 2002

(51) Int. Cl.[7] .............................................. H04B 10/00
(52) U.S. Cl. ...................... 398/118; 398/119; 398/120; 398/135; 398/136; 398/137; 398/138; 398/139; 398/182; 398/186; 398/189; 398/190; 398/191; 398/192; 398/197; 398/200; 370/332; 370/328; 370/342; 370/212; 370/213; 370/331; 340/825.6; 340/825.57; 375/238; 375/239; 375/219; 375/220; 455/608; 455/611; 455/617
(58) Field of Search ................................ 398/118, 119, 398/120, 135, 136, 137, 138, 139, 182, 186, 190, 189, 191, 192, 197, 200, 128; 370/332, 328, 342, 212, 213, 331; 375/238, 239, 219, 220; 340/825.57, 825.6; 455/608, 611, 617

(56) References Cited

U.S. PATENT DOCUMENTS 4,397,042 A * 8/1983 Tsujii et al. ................. 398/189
5,659,299 A  8/1997 Williamson et al.
6,188,494 B1 * 2/2001 Minteer ........................ 398/135
6,519,236 B1 * 2/2003 Haartsen et al. ............. 370/332

FOREIGN PATENT DOCUMENTS

EP  0884865 A2  12/1998

OTHER PUBLICATIONS

Pursley, Michael B. and Shea, John M., "Adaptive Signaling for Multimedia Transmission in CDMA Cellular Radio Systems," Military Communications Conference,; MIL-COM 98 Proceedings; IEEE Boston, MA; Oct. 1998; pp. 113–117; XP010307825; ISBN: 0–7803–4506–1.

* cited by examiner

Primary Examiner—Hanh Phan
(74) Attorney, Agent, or Firm—Jon A. Gibbons; Fleit, Kain, Gibbons, Gutman, Bongini & Bianco P.L.

(57) ABSTRACT

This invention extends the range of optical data of mobile device by trading speed for distance as well as integrating a plurality of pulses over time to define a single bit of information. The present invention uses a number of integrated pulses to represent a single bit instead of utilizing a one to one correspondence between pulses and bits. The present invention executes a range extender application which executes on the mobile device without any hardware modification to the mobile device. The range extender application causes the optical transmitter to "stutter" or repetitively emanate the identical pulse representing a bit of information. Sufficient photons are thereby gathered at a receiver to reach a predetermined threshold. A tradeoff of the data transmission frequency in this invention is that a signal intensity drops by a factor of 100 when distance increases by a factor of 10 yielding a distance/intensity ratio of 1/10.

15 Claims, 8 Drawing Sheets

SYSTEM AND METHOD FOR REMOTE OPTICAL DIGITAL NETWORKING OF COMPUTING DEVICES

CROSS-REFERENCE TO RELATED APPLICATIONS

Not Applicable

BACKGROUND OF THE INVENTION

1. Field of the Invention

The present invention relates generally to hand-held electronic devices. More specifically the present invention relates to a communications technique for facilitating data transfer between a hand-held device and a station.

2. The Prior Art

Prior art related to the invention that is currently on the market comprises the software aspect of networking and resource discovery. For example, International Business Machine's TSpaces is an attempt to provide developers with a Java-based distributed-object architecture including a development platform, processing environment, and addressing mechanism. Also, WBI, or Web Intermediaries, addresses the concept of transcoding. WBI intermediaries are computational entities that can be positioned anywhere along the HTTP stream and are programmed to tailor, customize, personalize, or otherwise enhance data as they flow along the stream. A caching web proxy is a simple example of an HTTP intermediary. Intermediary-based programming is particularly useful for adding functionality to a system when the data producer (e.g., server or database) or the data consumer (e.g., browser) cannot be modified. In addition to the preceding, a corporation called Pacific Neo-Tek makes software to modulate optical communication to convert a Palm Pilot into a remote control for televisions. These products are available either through a subscription or through outright purchase of its software.

Further, many hand-held computing devices are emerging as invaluable configurations particularly useful for organizing and storing user input information. Some of those configurations are known as personal data assistance or personal digital assistant (PDA) devices. In general, PDA's are compact, streamlined, user input and user interface devices possessing a modest footprint which facilitates mobility and ease of storage. As such, PDA's have been vying with, and proven beneficial as alternatives to, desktop and personal computers (PC's).

Many PDA's are even beginning to communicate with networks and other computing systems in order to remotely control equipment, share information and programs. Applications include receiving and sending email, synchronizing appointment calendars, address lists, memos, price lists, client records, and other business and private data. Typically, the physical layer of communication have been devices such as serial port interfaces, phone modems, optical (IR) and radio frequency (RF) and other similar devices useful in transferring data.

This transfer, however, has involved compromise. For example, some PDA's require the use of a phone modem that attaches to the PDA, increasing the weight and size, and requires a cable to connect to a phone receptacle. Further, wired connection is inconvenient in public settings (restaurants, retail stores), travel (airports, train stations) and in vehicles (airplanes, cars, buses, trains). Radio frequency modems are expensive, often not allowed to operate in airplanes and hospitals, and are regulated by laws that vary by country.

Figure 1:
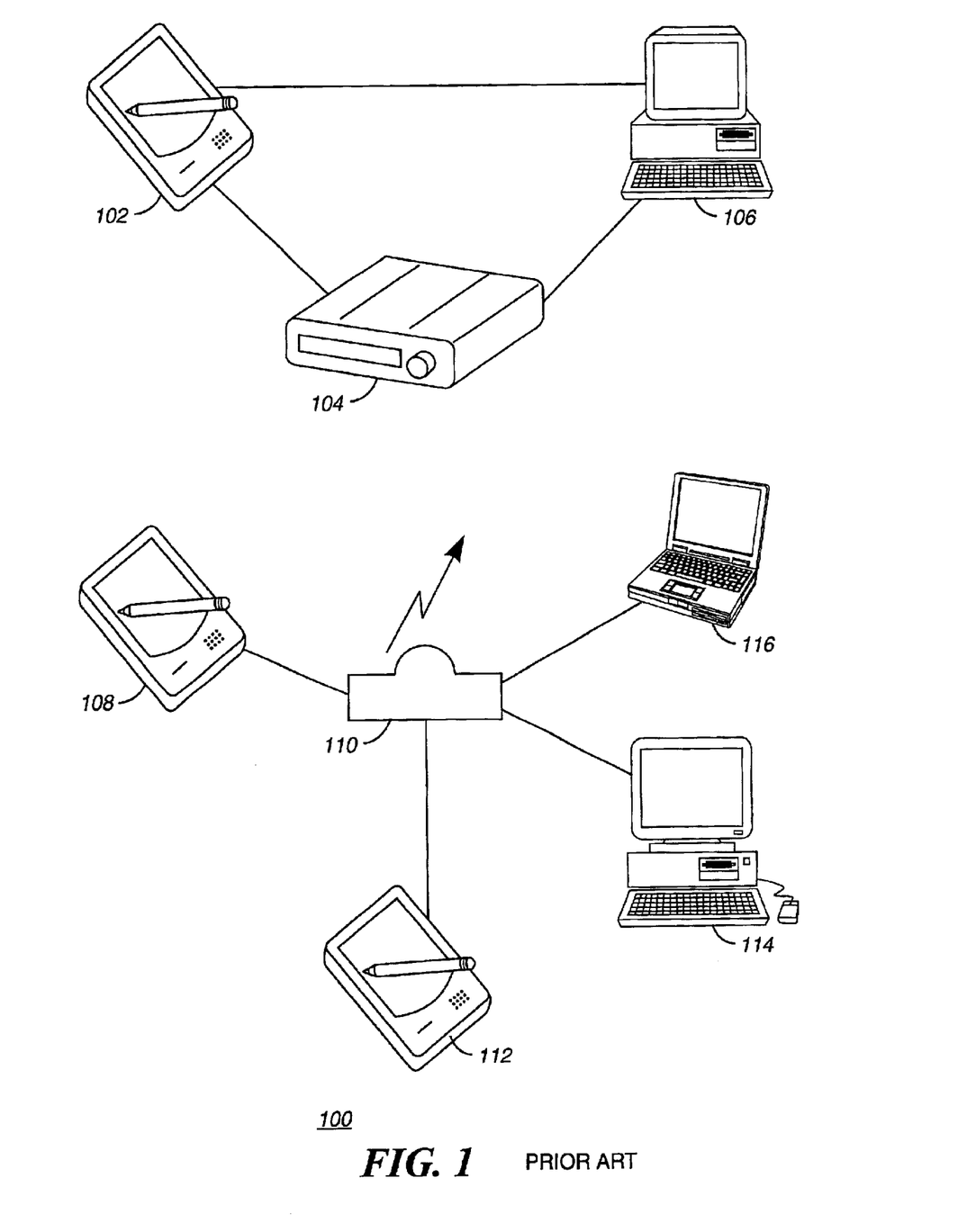
FIG. 1 is a system level overview of a typical prior art Personal Digital Assistant Communication Techniques.

Many PDAs, for example 3 COM's Palm Pilot and Windows CE based devices, currently exchange information by an IR port, according to the widely adopted standard for inter-device communication specified by IRDA (Optical Data Association). There are over 150 million devices with IRDA ports installed, including laptops, mobile phones, PDAs, and printers. FIG. 1 illustrates a PDA (102) communicating via a phone modem (104) to a remote computer (106), and as a wireless alternative a PDA (108) communicating via a built-in IR transceiver (110) with another PDA (112) with built-in IR transceiver (113) over an optical path (111), a PC (114) with built-in IR transceiver (115), and a laptop (116) with built in IR transceivers (117). Although IRDA is useful, it is not without its shortcomings. For example, IRDA limits communication to short ranges, typically within 1 meter. IRDA also does not teach multicast communication between a plurality of devices. In addition, the optical protocols are application and device specific, making it difficult to communicate between heterogeneous devices and applications.

Accordingly, it is desirable to extend the range of optical data communication, and heterogeneous devices and application to control equipment, share data and exchange programs (code). With such a large installed base of IRDA devices, it is desirable to implement the extended range and heterogeneous communication without altering the hardware of the devices.

SUMMARY OF THE INVENTION

In particular, this invention extends the range of a remote optical device by trading communication speed for communication distance, by sending a plurality of pulses overtime (a process called bit stuffing) to define a single bit of information. A base station integrates the plurality of pulses overtime to reconstruct each single bit of information. The base station communicates to the remote optical device with a much brighter IR output signal, allowing the base station to send one pulse to define a single bit of information. This creates an asymmetric communication channel between the remote device and the base station. The asymmetry typically matches user's communication needs; a few commands are transmitted by the user's PDA to the base station (e.g., "Give me my new email") and a lot of data is downloaded from the base to the PDA (e.g., dozens of emails).

The invention increases current IRDA ranges from 1 m to 10 meters or more. The range increase can be accomplished by changing the software that controls the IRDA hardware without modifying the IRDA hardware. The software (code) can be changed at the factory by the manufacturer or in the field by the user, typically by uploading a driver that controls the IRDA hardware. It is possible to distribute the code over the Internet, allowing wide distribution of the invention to many users.

The base stations can also serve the function of relay stations, allowing two or more optical devices to communicate over great distances. In addition, transcoder features of the invention allow heterogeneous devices and programs to communicate with each other.

Since the sensitivity of the PDA optical transmitter and receiver are direction dependent, the user may need to orient their PDA to establish a data link. To assist the user, the code installed in the PDA may include a signal strength meter to provide visual feedback of IR link strength.

BRIEF DESCRIPTION OF THE FIGURES

The subject matter which is regarded as the invention is particularly pointed out and distinctly claimed in the claims at the conclusion of the specification. The foregoing and other objects, features, and advantages of the invention will be apparent from the following detailed description taken in conjunction with the accompanying drawings.

DETAILED DESCRIPTION OF THE PREFERRED EMBODIMENTS

It is important to note that these embodiments are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in the plural and vice versa with no loss of generality.

In the drawing like numerals refer to like parts through several views.

Remote Optical Digital Networking of Computing Devices

Figure 2:
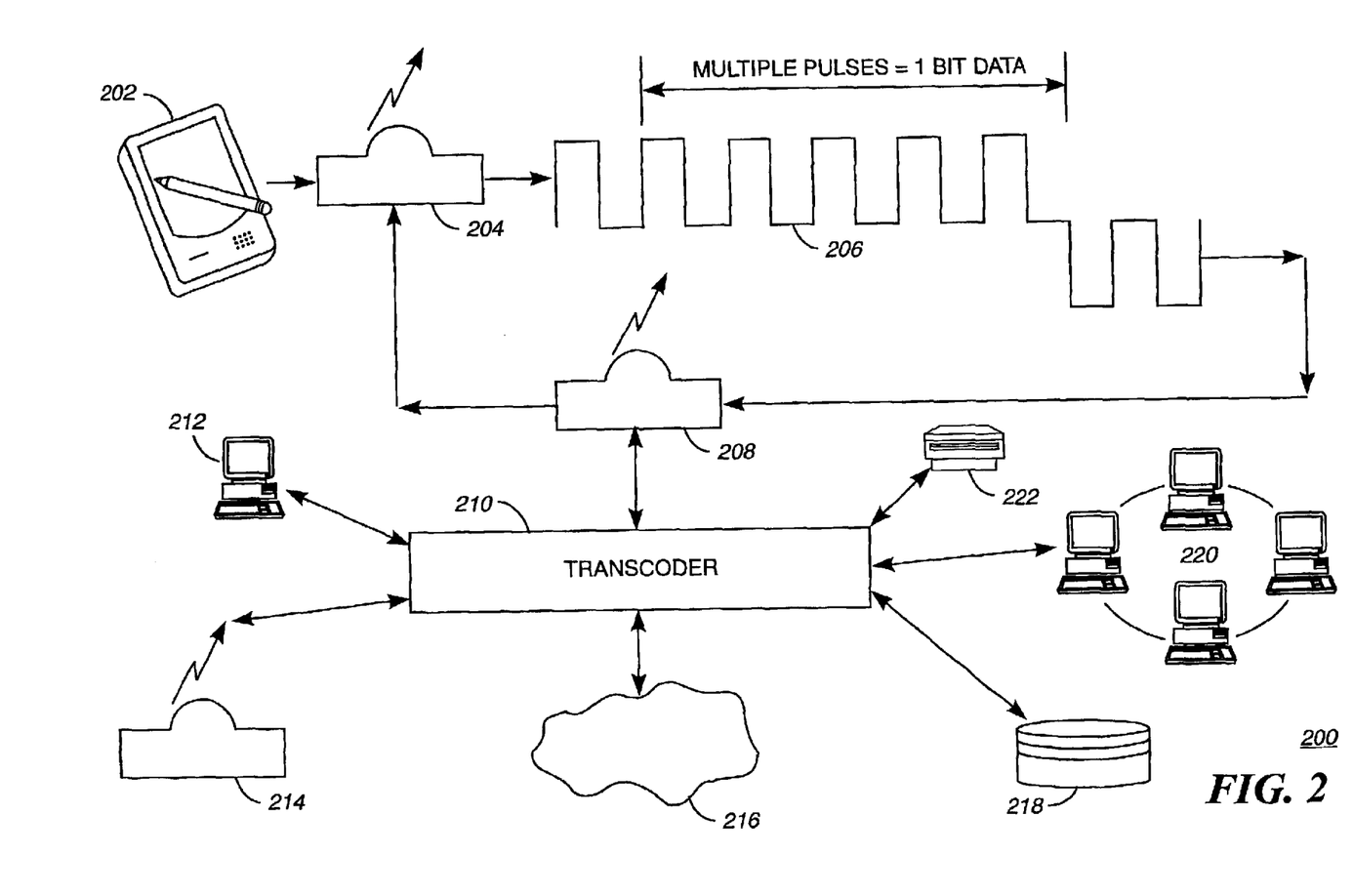
FIG. 2 is a block diagram of the basic structure for Remote Optical Digital Networking of Computing Devices as practiced by this invention.

FIG. 2 is a block diagram (200) of the basic structure for Remote Optical Digital Networking of Computing Devices as practiced by this invention. The Remote Optical Digital Networking of computing devices comprises a PDA (202), an optical transceiver (204) built into the PDA, an access point (208) and a transcoder (210) that permits communication with a plurality of diverse devices (212 through 222). In particular, the PDA (202) is an unmodified PDA with built-in IRDA hardware such as 3COM's Palm 3 or Palm 5 or many of the WinCE or Windows Pocket PC PDAs. Firmware in the PDA (202) implements an asymmetric speed IR transceiver (204) that is slow at transmitting because a sequence of optical pulses (206) are transmitted to encode one data bit and fast at receiving because one optical pulse (205) is received to represent one data bit.

The sequence of optical pulses (206) are detected and reconstructed at the access point (208) into data bits. In a preferred embodiment, the reconstruction includes an integration of the energy of each received optical pulse, producing a combined signal greater in magnitude than an individual optical pulse, resulting in enhanced range.

The Access Point (208) includes multiple high power IR emitters capable of producing a single IR pulse (205) of sufficient energy detectable by the IR transceiver (204).

In addition, the Remote Optical Digital Networking of FIG. 2 permits communication with a plurality of devices via a plurality of protocols and formats by utilizing a transcoder. The Transcoder (210) translates communication protocols, data formats, commands and control logic from one computing device and application to another. Web intermediaries as taught in "Intermediaries: An approach to manipulating information streams" published in the IBM Systems Journal Vol. 38 No.4 1999 page 629–640, by authors and developers R. Barrett and P. P. Maglio, provides a more detailed description of transcoding. Through the use of the Transcoder (210) the PDA (202) communicates with other devices such as other Access Points (214), other networks including the Internet (216), and devices on networks (220), as well as computers (212), printers (222), databases (218) and mass storage. Multiple PDAs (213) can communicate through one or more Access Points (208) thereby extending the range of PDA to PDA IR communication.

Networking Structure of Access Point

Figure 3:
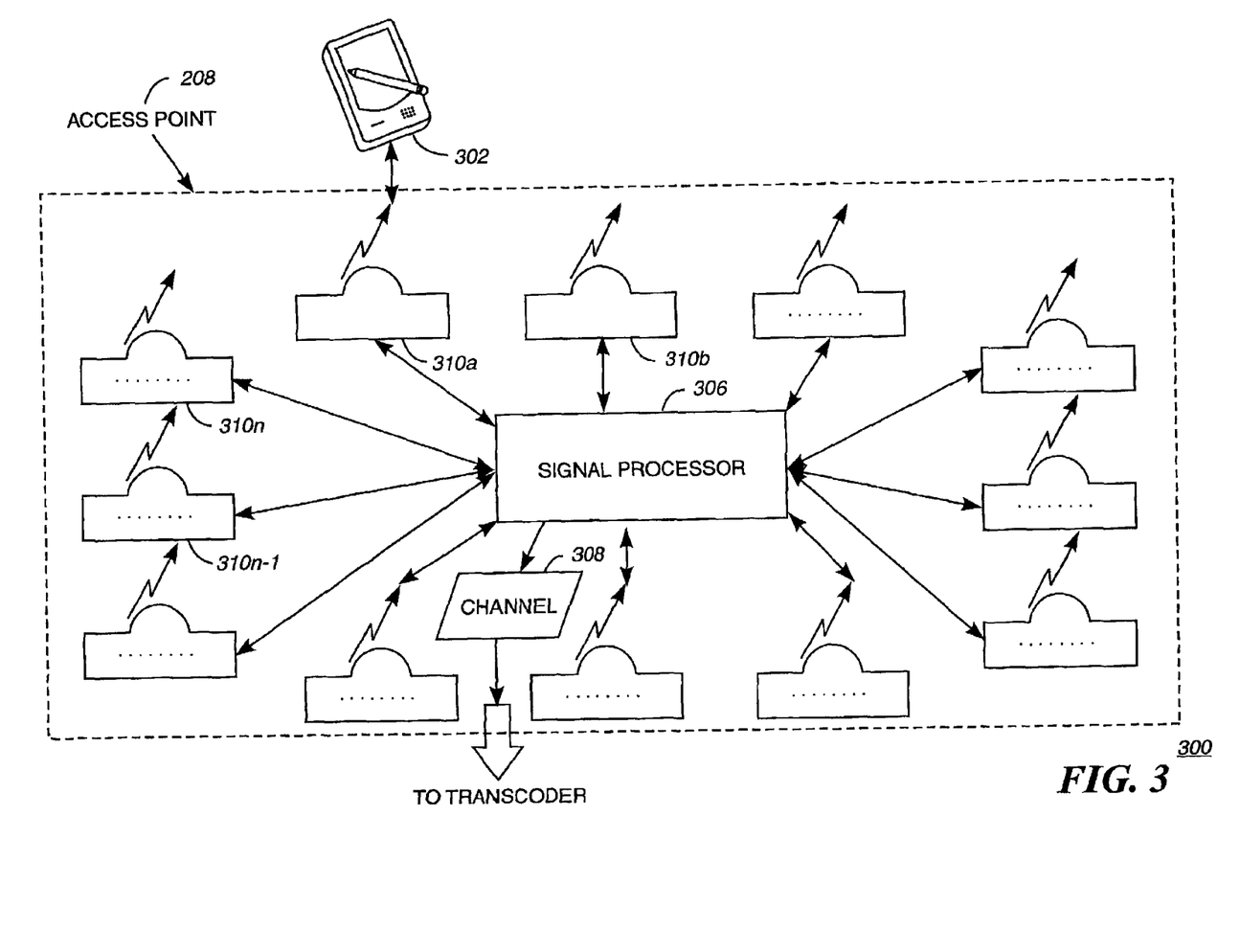
FIG. 3 is a block diagram of the basic structure for Remote Optical Digital Networking showing the internal structure of an Access Point, according to the present invention.

FIG. 3 is a block diagram (300) of the basic structure for Remote Optical Digital Networking showing the Internal Structure of an Access Point (208). The Access Point comprises electro-optical transceivers (310a to 310n), a signal processor (306) and a second channel (308). The Access Point (208) comprises a plurality of IR transceivers (310a to 310n) comprising IR receivers to cover a large sensing volume and receive low power low speed IR transmissions from the PDA, and a plurality of high power IR emitters to cover a large transmitting volume. The plurality of optical receiver and transmitter pairs are disposed spatially around the Access Point (208) where each pair covers a solid angle. To save energy data is transmitted and received on the same transmitter receiver pair. In other words, when data is received on a given transmitter receiver pair, data is transmitted from the same pair. This also allows multiple simultaneous spatially multiplexed communication channels. For example a PDA can be communicating with IR transceiver (310a), while another PDA on the other side of the Access Point (208) can be communicating with IR transceiver (301g).

FIG. 3 also illustrates a Signal processor (306) that receives a sequence of signals from the aforementioned IR transceivers (310a to 310n) and combines and reconstructs the sequence of signals into data bits. The signal processor (306) also converts data to be sent to the PDA (302) into signals applied to the high power IR emitters of the Access Point (208). In addition, the Access Point (208) also contains a Second channel (308) to digitally link (transmit and receive data to and from) the signal processor (306) and the transcoder (210) of FIG. 2. The second channel (308) comprises any one of the following:

1. an AC modem to transceiver (transmit and receive) data across ordinary power lines;
2. an RF modem to wirelessly transceiver data e.g., 2.4 GHz spread spectrum available from Aironet, or UHF available from Lynx Inc. or RF Monolithics, Inc for lower cost;
3. an analog phone modem to transceiver data across ordinary phone lines;
4. an asynchronous wire such as RS-485 and RS-232 standards; and
5. an Ethernet controller to transceiver data across wires.

Accordingly, using the IR transceivers (310a to 310n) along with the second channel (308), it should be understood that the present Invention enables devices with different protocols to communicate with each other, thereby sharing data and resources (e.g., printing, storage, computation).

Moreover, the present invention permits PDAs to communicate with single or multiple PDAs, with other architectures over the second channel (308) like Point of Sales (POS) terminals, the Internet, cellular phones, laptops, printers, and desktop computers.

Figure 4:
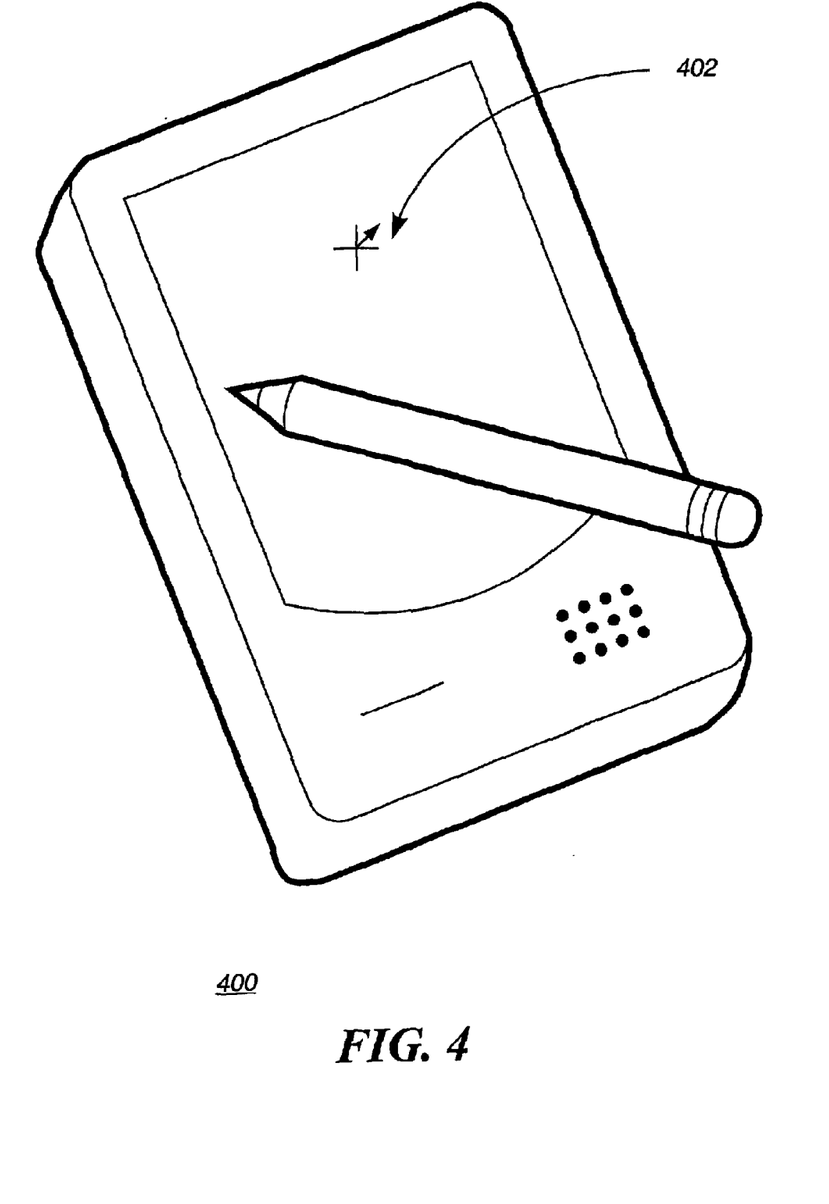
FIG. 4 is a Personal Digital Assistant illustrating a mechanism showing the direction of the strongest signal strength in order for a user to direct his PDA in that direction, according to the present invention.

To provide a reliable connection, a visual representation of signal strength is displayed on the PDA (302). This assists the user in pointing the PDA (302) towards the Access Point (208). In order to accomplish this, the Access Point (208) transmits a synchronization header that provides a PDA (302) receiver along with PDA range extender software (as further described below) to detect signal strength. The software can measure the signal strength, for example, by counting the number of pulses received, or by counting the number of errors in a packet of data. The greater the number of pulses detected by the PDA, or the less errors in a packet, the greater the signal strength. An alternative method for the PDA to measure received signal strength is to graduate the pulse width, and therefore the energy, of a synchronizing signal. FIG. 4 is a PDA (400) illustrating a mechanism showing signal strength in the form of a bar graph (402) with peak indicator (403), in order for a user to direct his PDA in that direction. The peak indicator (403) shows the maximum signal received over a short period of time, for example 3 seconds. The users waves the PDA (400) around a room and uses the bar graph (402) and peak indicator (403) to determine the best orientation for maximum signal reception from an Access Point (208). Next, a description of a functional overview of the signal processing provided by the invention is described.

PDA Software

Figure 5A:
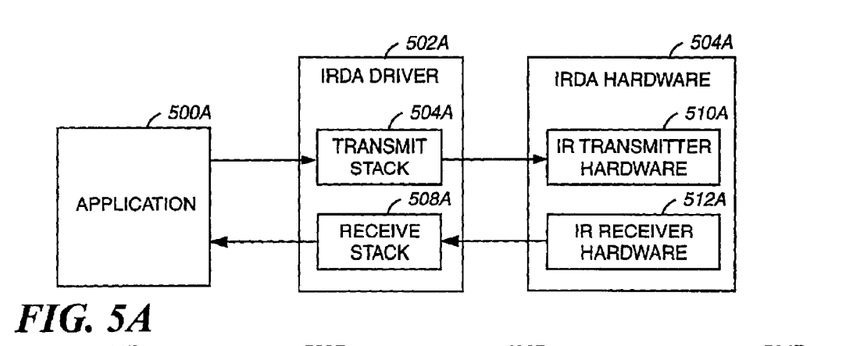
FIGS. 5A–5D are block diagrams of embodiments of software implementations of the range extender software running in the PDA, according to the present invention.

FIGS. 5A–5D are block diagrams of embodiments of software implementations of the range extender software running in the PDA. FIG. 5A illustrates conventional PDA that communicates to external devices using IRDA, consisting of an Application (500A) an IRDA Driver (502A) and IRDA Hardware (504A). The Application (500A) writes bytes it wants to transmit to a Transmit Stack (506A) in the IRDA Driver (502A), and the IRDA Driver (502A) periodically pulses the data out the IR Transmitter (510A) of the IRDA Hardware (504A). The IRDA Driver (502A) receives IR pulses from the IR Receiver (512A), assembles them into data bytes, and puts them onto the Receive Stack (508A), which the Application 500A periodically reads.

Figure 5B:
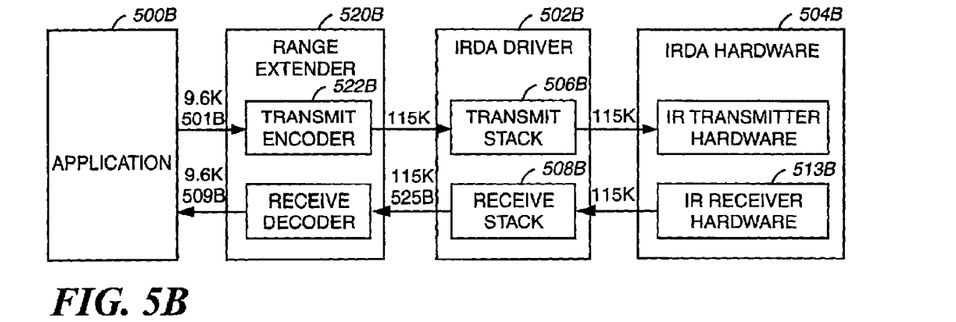

FIG. 5B shows how the invention can be added to a PDA to extend PDA transmit and receive range without rewriting the Application (500B), IRDA Driver (502B), or modifying the IRDA Hardware (504B), all of which typically reside in the PDA. Range Extender (520B) code is inserted between the Application (500B) and IRDA Driver (502B). In a particular example, the Transmit Encoder (522B) receives transmit bytes (501B) from the Application (500B) at 9.6 kbps (kbps=thousand bits per second), creates a sequence of bits for each data bit received, and places them on the Transmit Stack (506B) of the IRDA Driver (502B). The Receive Decoder (524B) reads received bytes at 115 kbps (525B) from the Receive Stack (508B) of the IRDA Driver (502B), decodes them, and puts them in a Receive Stack (508B) which the Application (500B) periodically reads at 9.6 kbps (509B). To the Application (500B) the Range Extender (520B) appears as an IRDA Driver (502B) operating at 9.6 kbps. To the IRDA Driver (502B the Range Extender (520B) appears as an Application (500B) communicating at 115 kbps. The transmit and receive rate of the Application (500B) is symmetric at 9.6 kbps.

The ratio of bit stuffing for the example of FIG. 5B is about 12 (115 kbps/9.6 bps), meaning that up to 12 bits can be transmitted to represent one message bit, without causing any build up of data in the Transmit Stack (506B). It should be understood that other ratios for bit stuffing are contemplated as different IR transceiver technology is deployed and that other bit stuffing ratios are within the true scope and spirit of the present invention.

Figure 5C:
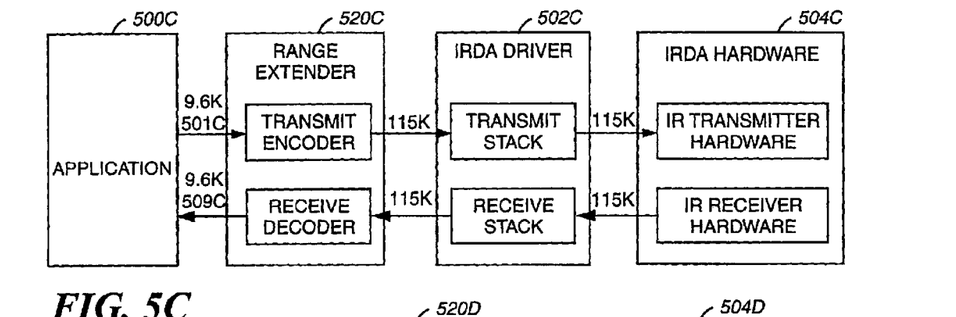

FIG. 5C shows an implementation where the Application (500C) uses the Range Extender (520C), IRDA Driver (502C), and IRDA Hardware (504C) to support asymmetric communication, for example transmitting at 9.6 kpbs (501C) and receiving at 115 kbps (503C).

Figure 5D:
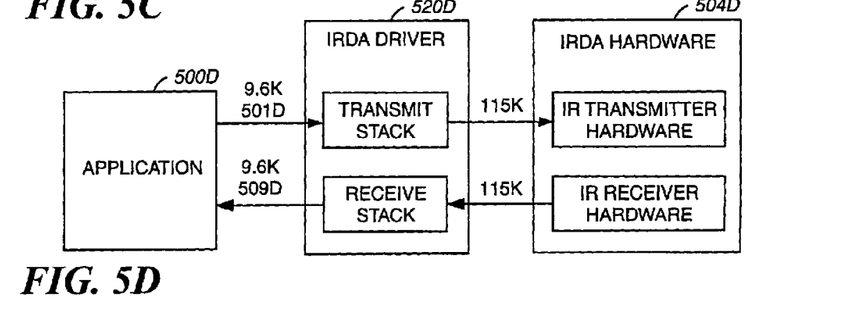

FIG. 5D shows a symmetric communication implementation, for example transmitting (501C) and receiving (509C) at 9.6 kbps, where the Range Extender (520D) replaces the function of the IRDA Driver (502C), taking on the responsibility of communicating directly with the IRDA hardware (504D). Although this requires more work for the code developer, it provides the greatest code, memory, and performance efficiency for the PDA.

In the examples of FIGS. 5B, 5C, and 5D the signal gain detected at the Access Point (208) and hence the extended range is a function of the ratio of the IR. Transmit data rate (507B) to the Application (500B) data rate (501B) the greater the ratio, the greater the integrated signal strength, and hence communication distance.

The present invention provides convenient wireless connectivity enabling Internet access, electronic commerce and other communication applications in public spaces such as restaurants, airports, malls, and retail stores, and in transportation vehicles such as airplanes, cars, buses, and trains. Moreover, the present invention permits international deployment and global use of this technology and applications because of the simplicity of the functionality and design of range extender software.

Bit Stuffing Logic

Figure 6:
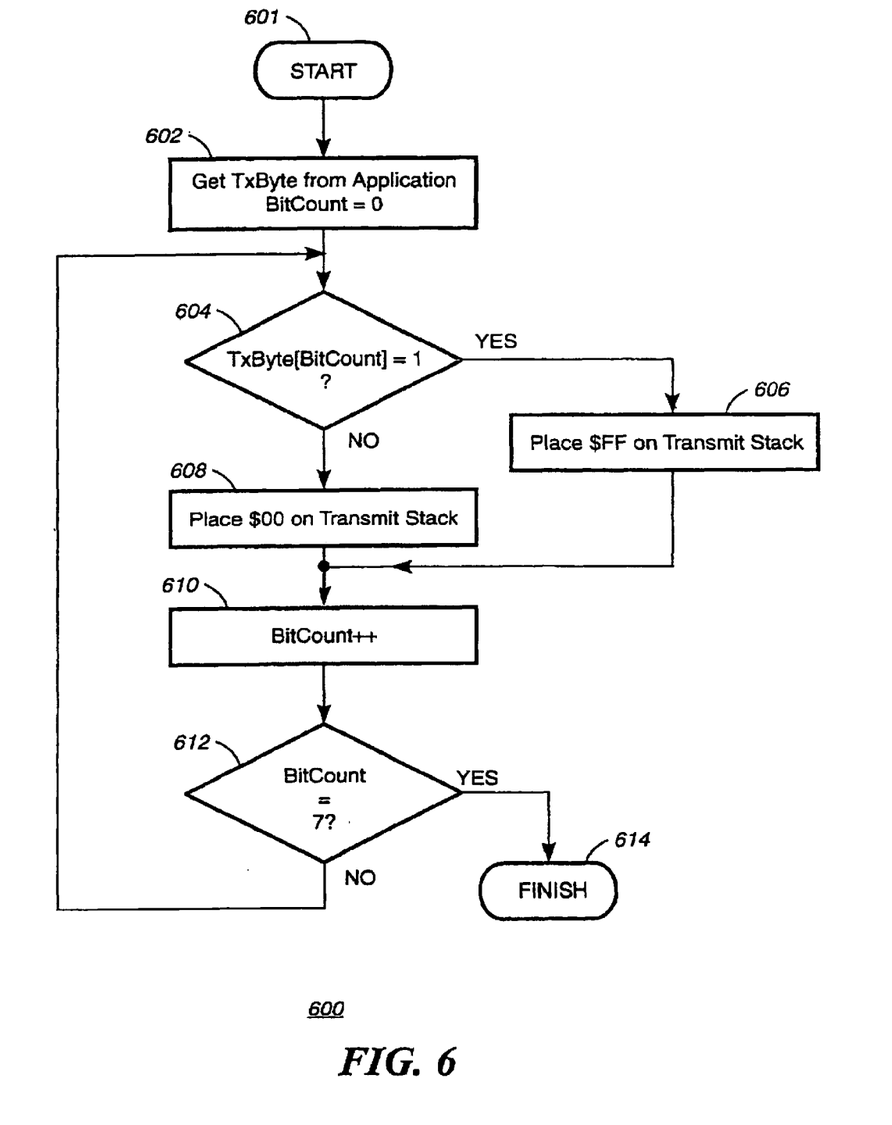
FIG. 6 is a flow chart of the transmit byte encoder logic running in the PDA, according to the present invention.

FIG. 6 illustrates the bit stuffing logic (600) of the Transmit Encoder (522B). The Transmit Encoder (522B) outputs a multitude of bits for every bit received on an input. In the example shown in FIG. 6, 8 bits are output for every bit input, a convenient number in computing since many computing machines are based on 8, 16, or 32 bit operations. The routine starts at (601). A byte TxByte is input from the application at (602). For every bit starting with BitCount=0, a byte is placed on the Transmit Stack (504A). The bit state is tested at decision diamond (604). If the input bit TxByte is 1, an $FF (hex for 255) is placed on the Transmit Stack (504A) at block (606). Else a $00 is placed on the Transmit Stack (504A) at block (608). The bit count is incremented at (610). Bit completion is tested at decision diamond (612), and if affirmative ends the routine (614) or proceeds to the next bit (604).

Message Reconstruction Logic

Figure 7:
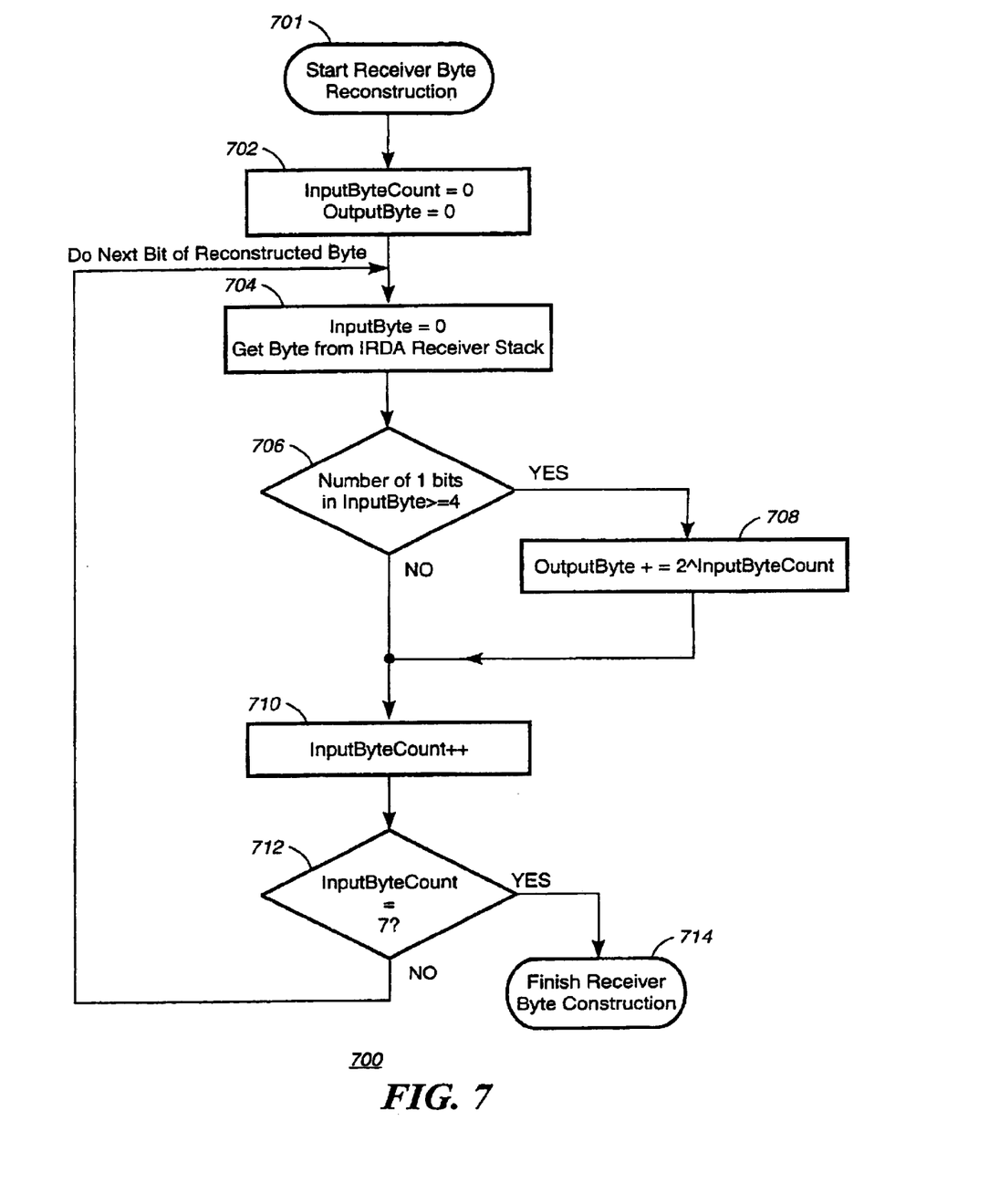
FIG. 7 is a flowchart of the receiver byte decoder logic running in the PDA, according to the present invention.

FIG. 7 illustrates the message reconstruction logic (700) of the Receive Encoder (524B). The procedure receives multiple bytes from the Receiver Stack (508B), interprets the redundant bits added by the bit stuffer logic (600), and outputs a reconstructed message byte. In this example the reconstruction logic (700) receives 8 input bytes for every 1 byte it outputs. The routine starts at (701). The InputByteCount and OutputByte are reset at block (702). An InputByte is retrieved from the Receiver Stack (508B) at block (704). In decision diamond (706), if the number of bits of value 1 are greater or equal to a threshold value in this example of 4, flow control goes to block (708) to set the bit in the output byte+=$2^{InputByteCount}$, otherwise flow control goes to block (710).

The number of bits should theoretically be 8 or 0 (all or nothing), but can be in between these extremes due to noise.

A threshold value of 4 allows the reconstruction logic to reconstruct OutputBytes in the presence of noise. In another embodiment a threshold of 6 and 2 is used to as a high and low threshold. If the number of bits of value 1 falls between these values, the bit is rejected as containing too much noise and an error message is sent to the application (500B).

Block (708) adds the binary weighted value of the InputByteCount to the OutputByte. This assumes that the data received by the IR Receiver Hardware (513B) are least significant bit first. Block (710) increments the InputByteCount. If the InputByteCount is equal to 7, as determined in decision diamond (712), the routine is finished (714), otherwise flow passes to block (704) for the next bit to be reconstructed.

In the preferred embodiment taught in FIG. 6 and FIG. 7, 8 bits are stuffed and transmitted to represent 1 message bit, and correspondingly 8 bits are received and processed to reconstruct 1 message bit. For example, a data byte $B2 (hex notation, 10110010 in binary notation, and 178 in decimal notation) is sent from the Application (500B) to the Range Extender (520B). The Range Extender (520B) receives the message byte $B2 and places the byte sequence $FF $00 $FF $FF $00 $00 $FF $00 on the Transmit Stack (506B). The access point (208) receiver the sequence of 8 bytes, gaining signal strength since each message bit is represented by 8 transmitted bits, and therefore increasing transmission range at the expense of data rate, which is reduced by a factor of 8.

Access Point Synchronization Process

Figure 8:
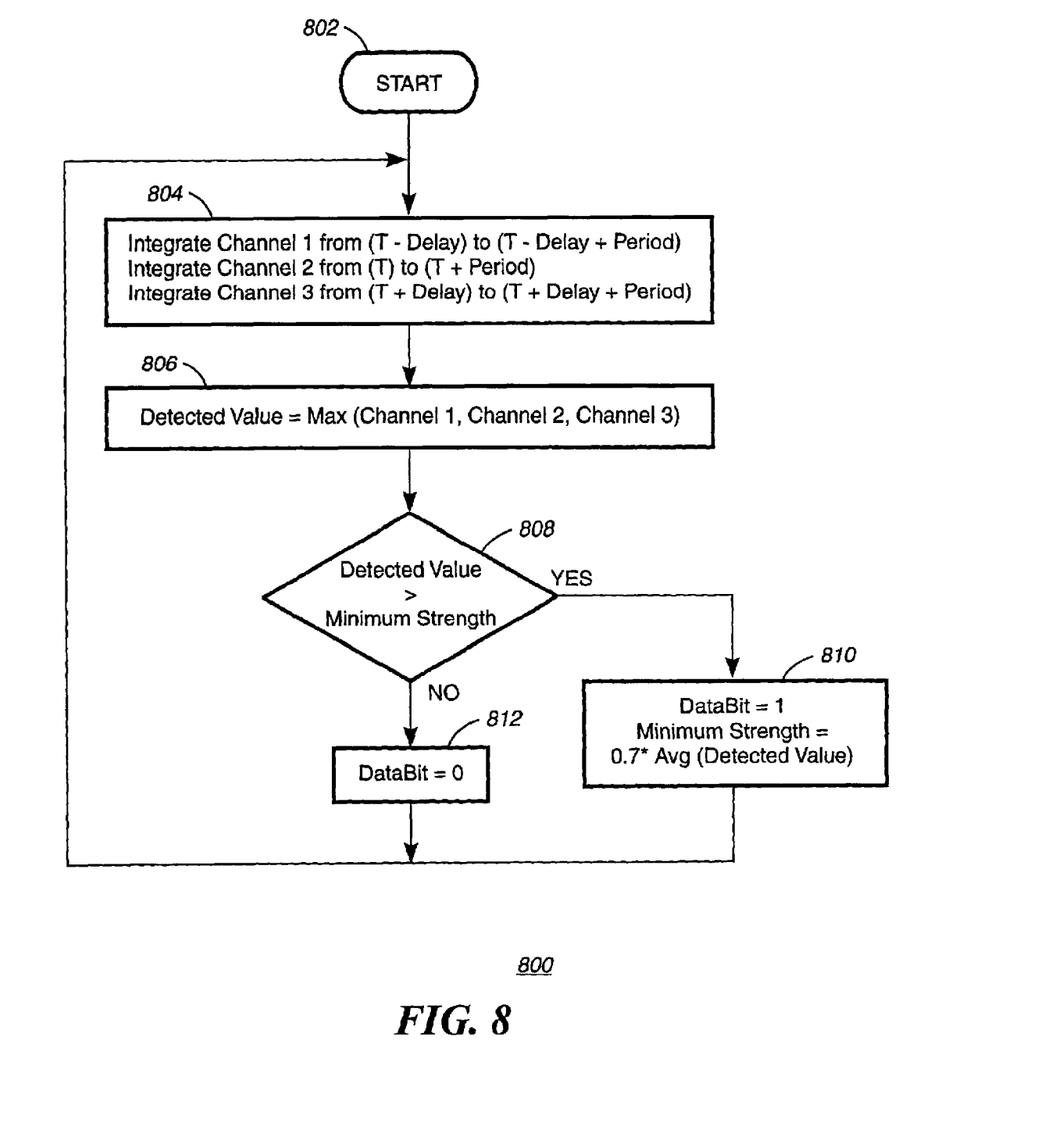
FIG. 8 is a flow chart of the synchronization process running on an access point for receiving pulses running on the PDA, according to the present invention.

FIG. 8 is a flow chart of the synchronization process (800) running on an Access Point (208) for receiving pulses running on the PDA, according to the present invention. IN the preferred embodiment three synchronization channels are used for access point (208) but it should be understood that any number of synchronization channels can be user (i.e., IR transceivers (310a to 310n)). The delay for each channel is offset by the Period/n, so for the example of three channels where n=3, the T/3 is the delay. The period is defined as one cycle for the wave form. The process starts with Channel 1, Channel 2 and Channel 3 each receiving a signal (804) as follows:

Integrate Channel 1 from (T−T/3) to (T−T/3+Period);

Integrate Channel 2 from (T) to (T+Period);

Integrate Channel 3 from (T+T/3) to (T+T/3+Period).

The maximum of each received channel is determined and set to Detected Value (806). Once the maximum is determined, a test is made to determine if the maximum value detected is larger than the MinimumStrength (806). The MinimumStrength initially is set to a system constant for the access node (208) but is dynamically updated based on the last Detected Value. In this example, the minimum value is set to 70% of the last detected value (810) and the process repeats. In the event the Detected Value of the maximum detected channel (808) is not greater than the MinimumStrength, the databit is set to a logic value of one (810). Using this process flow, it should be understood how an individual access point (208) having multiple IR transceiver channels can synchronize with IR communications from the PDA (302). Accordingly, the invention permits communication via an access point through multiple spatially multiplexed communication channels at the access point.

Conclusions

The invention is a combination of hardware, firmware, and software that extends the range and capability of computing devices to communicate with each other through optical ports. The invention uses pre-existing computing devices, particularly but not limited to PDAs, without hardware modification. There are millions of PDA and tens of millions of laptops, printers, and other computing devices in use today that can benefit from the invention.

Thus, an improved optical networking system and method has been described that overcomes the deficiencies of the prior art. In particular, this invention provides the following benefits:

The invention allows PDAs to communicate over large distances of up to 10 meters and greater.

The invention permits PDAs to communicate with single or multiple PDAs, with other architectures like Point of Sales (POS) terminals, the Internet, cellular phones, laptops, printers, and desktop computers.

The invention provides convenient wireless connectivity enabling Internet access, electronic commerce and other communication applications in public spaces such as restaurants, airports, malls, and retail stores, and in transportation vehicles such as airplanes, cars, buses, and trains.

The Invention enables devices with different protocols to communicate with each other, thereby sharing data and resources (e.g., printing, storage, computation).

The invention allows international deployment and global use of this technology and applications because of the simplicity of the functionality and design of this invention.

The invention permits, through the use of a measurement of signal strength and the repetitive pulses representing a bit of data, a user can effectively direct his device to the source of the signal, namely an access point.

The invention permits communication via an access point through multiple spatially multiplexed communication channels at the access point.

Discussion of Hardware and Software Implementation Options

The present invention, as would be known to one of ordinary skill in the art could be produced in hardware or software, or in a combination of hardware and software. The system, or method, according to the inventive principles as disclosed in connection with the preferred embodiment, may be produced in a single computer system having separate elements or means for performing the individual functions or steps described or claimed or one or more elements or means combining the performance of any of the functions or steps disclosed or claimed, or may be arranged in a distributed computer system, interconnected by any suitable means as would be known by one of ordinary skill in art.

According to the inventive principles as disclosed in connection with the preferred embodiment, the invention and the inventive principles are not limited to any particular kind of computer system but may be used with any general purpose computer, as would be known to one of ordinary skill in the art, arranged to perform the functions described and the method steps described. The operations of such a computer, as described above, may be according to a computer program contained on a medium for use in the operation or control of the computer, as would be known to one of ordinary skill in the art. The computer medium which may be used to hold or contain the computer program product, may be a fixture of the computer such as an embedded memory or may be on a transportable medium such as a disk, as would be known to one of ordinary skill in the art.

The invention is not limited to any particular computer program or logic or language, or instruction but may be practiced with any such suitable program, logic or language, or instructions as would be known to one of ordinary skill in the art. Without limiting the principles of the disclosed invention any such computing system can include, inter alia, at least a computer readable medium allowing a computer to read data, instructions, messages or message packets, and other computer readable information from the computer readable medium. The computer readable medium may include non-volatile memory, such as ROM, Flash memory, floppy disk, Disk drive memory, CD_ROM, and other permanent storage. Additionally, a computer readable medium may include, for example, volatile storage such as RAM, buffers, cache memory, and network circuits.

Furthermore, the computer readable medium may include computer readable information in a transitory state medium such as a network link and/or a network interface, including a wired network or a wireless network, that allow a computer to read such computer readable information.

What is claimed is:

1. An optical communication system to extend a range or data communications comprising:
   a mobile communication device with at least one associated optical transmitter and an optical receiver coupled thereto;
   at least one software application capable of executing on the mobile device and communicating a plurality of message bits to at least one external device using the optical transmitter and the optical receiver;
   at least one transmit stack coupled to the optical transmitter so that a bit placed in the transmitter stack is transmitted out the optical transmitter;
   a range extender application which executes without any hardware modification to the mobile device, the range extender application operable for extending a physical range of at least the optical transmitter by taking each message bit sent by the software application and converting the message bit to a set of a plurality of optical transmission pulses to be placed on the transmit stack for optical transmission via the optical transmitter to the external device.

2. The optical communication system of claim 1, wherein the set of optical transmission pulses are repetitive and identical to each bit placed in the transmit stack.

3. An apparatus to extend a range of infrared data communication, the apparatus comprising:
   a device for receiving user inputs;
   at least one infrared transmitter and at least one infrared receiver associated with the device;
   at least one software application capable of executing on the device and communicating a plurality of message bits to at least one external device using the infrared transmitter;
   at least one transmit stack coupled to the infrared transmitter so that a bit placed in the transmitter stack is transmitted out the infrared transmitter; and
   a range extender application which executes without any hardware modification to the device, the range extender application operable for extending a physical range of at least the infrared transmitter by taking each message bit sent by the software application and converting the message bit to a set of a plurality of optical transmission pulses to be placed on the transmit stack for optical transmission via the infrared transmitter to the external device.

4. The apparatus as defined in claim 3, wherein the device for receiving user inputs comprises pre-existing unmodified hardware devices selected from the group of pre-existing unmodified hardware devices of: a personal data assistant, a 3Com Palm Pilot compatible device, and a Windows CE based device.

5. The apparatus as defined in claim 3, further comprising:
   infrared receiver associated with the device; and
   a display for displaying a visual representation of incoming signal strength by the infrared receiver.

6. The apparatus as defined in claim 5, wherein the incoming signal strength is measured by counting a number of error packets in pulses received by the infrared receiver.

7. The apparatus as defined in claim 5, wherein the incoming signal strength is measured by a summation of pulses received by the infrared receiver.

8. The apparatus as defined in claim 5, wherein the incoming signal strength is measured through determination of at least one pulse width of pulses received by the infrared receiver.

9. The method as defined in claim 3, wherein an incoming signal strength of the optical transmission pulses is measured and compared to a predefined threshold and in response to the incoming signal strength being greater to a threshold, a byte in a receive stack associated with the infrared receiver is set.

10. A method for extending a range of infrared data communication between a user device and another device, the method on the user device comprising the steps of:
    receiving user inputs on a user device;
    transmitting optical data as signals from an optical transmitter associated with the user device, whereby the optical data corresponds to a plurality of message bits sent by at least one software application executing on the user device; and
    executing a range extender application which executes without any hardware modification to the user device, the range extender application operable for extending a physical range of the optical transmitter by taking each message bit sent by the software application and converting the message bit to a set of a plurality of optical transmission pulses to be placed on a transmit stack for transmission via the optical transmitter to an another device.

11. The method as defined in claim 10, wherein the step of receiving user inputs includes receiving user inputs on a user device comprising user pre-existing unmodified hardware devices selected from the group of user pre-existing unmodified hardware devices of: a personal data assistant, a 3Com Palm Pilot compatible device, and a Windows CE based device.

12. The method as defined in claim 10, further comprising:
    displaying, on a display, a visual representation of incoming signal strength by an optical receiver associated with the user device.

13. A computer readable medium containing programming instructions for extending a range of infrared data communication between a user device and another device, the computer readable medium comprising the programming instructions of:
    receiving user inputs an the user device;
    transmitting optical data as signals from an optical transmitter associated with the user device, whereby the optical data corresponds to a plurality of message bits sent by at least one software application executing on the user device; and
    executing a range extender application which executes without any hardware modification to the user device, the range extender application operable for extending a physical range of the optical transmitter by taking each message bit sent by the software application and converting the message bit to a set of a plurality of optical transmission pulses to be placed on a transmit stack for transmission via the optical transmitter to an another device.

14. The computer readable medium as defined in claim 13, wherein the programming instructions of receiving user inputs includes receiving user inputs on a user device comprising user pre-existing unmodified hardware devices selected from the group of user pre-existing unmodified hardware devices of: a personal data assistant, a 3Com Palm Pilot compatible device, and a Windows CE based device.

15. The computer readable medium as defined in claim 13, further comprising the programming instruction of:
displaying, on a display, a visual representation of incoming signal strength by the optical receiver associated with the user device.

* * * * *